US007463471B2

(12) United States Patent
Frescaline et al.

(10) Patent No.: US 7,463,471 B2
(45) Date of Patent: Dec. 9, 2008

(54) SPARK-GAP DEVICE, PARTICULARLY HIGH-VOLTAGE SPARK-GAP DEVICE

(75) Inventors: Laurent Frescaline, Aynac (FR); Gilles Avrillaud, Rueyres (FR)

(73) Assignee: Ivanhoe Industries, Inc., Albuquerque, NM (US)

( * ) Notice: Subject to any disclaimer, the term of this patent is extended or adjusted under 35 U.S.C. 154(b) by 421 days.

(21) Appl. No.: 10/557,548

(22) PCT Filed: May 14, 2004

(86) PCT No.: PCT/FR2004/001192

§ 371 (c)(1),
(2), (4) Date: Nov. 21, 2005

(87) PCT Pub. No.: WO2004/109874

PCT Pub. Date: Dec. 16, 2004

(65) Prior Publication Data

US 2007/0058319 A1 Mar. 15, 2007

(30) Foreign Application Priority Data

Jun. 2, 2003 (FR) .................................. 03/06629

(51) Int. Cl.
*H02H 1/04* (2006.01)
*H02H 3/22* (2006.01)
*H02H 9/06* (2006.01)

(52) U.S. Cl. ........................ 361/118; 361/120; 361/117

(58) Field of Classification Search ................. 361/118, 361/120, 117
See application file for complete search history.

(56) References Cited

U.S. PATENT DOCUMENTS

| | | | | |
|---|---|---|---|---|
| 2,716,198 | A * | 8/1955 | McCallum | 313/231.01 |
| 3,230,410 | A | 1/1966 | Hueschen et al. | |
| 3,408,525 | A * | 10/1968 | Bahr | 313/146 |
| 3,450,922 | A | 6/1969 | Gallahger | |
| 3,524,099 | A * | 8/1970 | Stetson | 315/36 |
| 3,686,532 | A * | 8/1972 | Rudolph et al. | 361/130 |
| 4,267,481 | A * | 5/1981 | Sauder | 313/139 |
| 4,485,334 | A * | 11/1984 | de Witte | 315/167 |
| 6,392,862 | B1 * | 5/2002 | Kracht et al. | 361/118 |

FOREIGN PATENT DOCUMENTS

| | | |
|---|---|---|
| GB | 620 475 | 3/1949 |

* cited by examiner

*Primary Examiner*—Michael J Sherry
*Assistant Examiner*—Zeev Kitov
(74) *Attorney, Agent, or Firm*—Young & Thompson

(57) ABSTRACT

Spark-gap device including two discharge electrodes (2; 3) each having an elongated conductor portion (10; 5), called the active portion, with a connecting longitudinal end (11; 7) fixed to a connector. The electrodes are arranged in such a way that, when an electric arc is generated, the arc is formed between the active portions and the resulting electric current induces a magnetic field moving the electric arc along the active portions, preferably at an erosion-limiting high speed. At least a discharge electrode further includes at least a second conductor portion (9, 16; 6), called the passive portion, electrically connected to the connector and/or the active portion and with a form adapted to prevent a spontaneous electric arc from being inopportunely generated in normal usage conditions of the device.

27 Claims, 3 Drawing Sheets

SPARK-GAP DEVICE, PARTICULARLY HIGH-VOLTAGE SPARK-GAP DEVICE

The invention relates to a spark gap and is particularly advantageous in the case of a high-voltage spark gap allowing a large quantity of electric charge to be transferred.

FIELD OF THE INVENTION

A spark gap is a device of the circuit-closing switch type comprising two electrodes a certain distance apart, called discharge electrodes, separated by a dielectric (gas, vapor, vacuum, etc.), between which an electric arc is struck when the potential difference between the electrodes is above a threshold value. In a high-voltage spark gap, this threshold value is greater than a few kV, and the operating voltage of the spark gap (the voltage applied to the spark gap, that is to say the potential difference between its electrodes) may be up to 1 MV. Such a spark gap can transfer a quantity of electric charge ranging from a few hundred millicoulombs to several hundred coulombs, corresponding to an electric current of between 1 kA and 1 MA crossing the spark gap.

Such a high-voltage spark gap, combined with a current generator and especially with a capacitor capable of accumulating the abovementioned quantities of electric charge, is especially used for sequentially supplying a tester for materials under high pressure or any other device, called a load. Each operation in which the capacitor is discharged and the electric charge initially stored in the capacitor is transferred to the load, via the spark gap, is called a firing.

DESCRIPTION OF RELATED ART

Among known spark gaps, one of the more effective is a gas spark gap which comprises two hollow axisymmetric cylindrical discharge electrodes, each having an internal radius of around 8 cm, an external radius of around 10 cm and a length of around 20 cm. The two cylindrical electrodes are aligned “end to end”,that is to say arranged so that their axes of symmetry coincide, and they have axial ends called closure ends, separated by a distance of about 8 mm and facing each other along the axial direction (the direction of the symmetry axes) . It is between these axial closure ends, the facing annular end faces of which are substantially plane (in transverse planes), that the electric arc is struck. The opposed axial ends of the electrodes, called connection ends, are each connected to a connector for the purpose of integrating the spark gap into an electrical circuit. In particular, one of the connectors may serve for connecting up a current generator (capacitor) and the other for connecting up a load.

A firing is triggered by a third electrode, called a trigger electrode, which initiates the striking of an electric arc between the two discharge electrodes. During a firing, the electrical charges that the current generator transmits to the discharge electrode to which it is connected propagate from the connection end of the electrode toward its closure end along the axial direction, and are then deflected, by means of inclined slots provided in the closure end of the electrode, so as to be moved in a direction having a tangential component (along the circular perimeter of the electrode in a transverse plane). The electrical charges then cross the space between the electrodes in the axial direction, striking an axial electric arc, and are then again deflected tangentially in the closure end of the other discharge electrode by means of inclined slots (which are inclined in the opposite direction), in order subsequently to propagate approximately axially toward the connection end of the electrode.

This tangential movement of the electrical charges in the closure ends of the discharge electrodes induces a radial magnetic field, which moves the electric arc circularly along the annular faces of said closure ends. Depending on the quantity of charge transferred, the electric arc may perform several turns (usually two turns). It is found that the velocity of the arc in the second turn is greater than the velocity in the first turn, despite the lower current intensity.

Despite this movement, for a quantity of conducted charge greater than 140 C, the electric arc rapidly causes substantial wear of the closure ends of the electrodes by erosion, requiring the closure ends to be made of a special copper-tungsten alloy. This alloy, which is particularly expensive, increases the cost price of the spark gap. It is only at this price that the above-cited known spark gap can today claim a lifetime of 18 000 firings.

SUMMARY OF THE INVENTION

The object of the invention is to alleviate these drawbacks by proposing a simple and inexpensive spark gap, having performance characteristics similar or superior to known spark gaps.

In particular, the object of the invention is to provide a high-voltage spark gap that can operate at voltages similar to or greater than the usual operating voltages of the above-cited known spark gap, being able to switch currents of similar or higher intensity than the currents switched by the above-cited known spark gap, having a lifetime similar to or longer than that of the above-cited known spark gap, for a negligible undesirable-triggering/failure rate, and a lower cost price than the known spark gaps (and especially than the above-cited known spark gap).

The subject of the invention is a spark gap comprising:

two rigid discharge electrodes, fixedly mounted at a certain distance from each other, at least two connectors, each electrode being connected to one of the connectors for the purpose of connecting said electrodes to an electrical circuit comprising a current generator, and in which spark gap:

each discharge electrode has an elongate conducting portion, called the active portion, having a longitudinal end, called the longitudinal connection end, which is connected to the connector, and an opposed longitudinal end called the downstream end;

the active portions of the discharge electrodes are designed so that, when an electric arc is struck:

- this electric arc is struck between the active portions of the electrodes,
- this electric arc is struck between the active portions of the electrodes in a region, called the arc-triggering region, when the arc is intentionally initiated and
- an electric current drawn in the discharge electrodes induces, between said electrodes, a magnetic field that moves the electric arc along said active portions; and at least one discharge electrode has at least one other conducting portion, called the passive portion, which is electrically connected to the connector and/or to the active portion and has a shape designed to prevent any inopportune spontaneous striking of an electric arc (called self-triggering) under normal operating conditions of the spark gap.

It should be noted at the term “elongate” used to qualify the active portion of the discharge electrodes according to the invention, means that said active portion extends mainly along a line, called the directrix. In other words, it has a dimension along this directrix, called the length, which is greater than its other dimensions. Said directrix may be straight or curved. Moreover, the terms "transverse direction" of the active portion at a point denote a direction that is orthogonal, at this point, to the directrix (that is to say orthogonal to a direction tangential to said directrix) of the active portion; and "transverse plane" at a point is to understood to mean a plane orthogonal at this point to the directrix of the active portion. Likewise, the cross section of the active portion at a point is the cross section of said portion in the transverse plane passing through this point.

According to the invention, each discharge electrode of the spark gap therefore includes an elongate active portion. Through their shape and their relative arrangement, the active portions of the two electrodes are designed so that, when a current is drawn, the current is channeled and a magnetic field is induced between them that moves the electric arc along said portions. The active portions provide an elongate arc-movement surface, which advantageously contains no slots.

Moreover, at least one discharge electrode according to the invention also includes at least one passive portion specifically provided for preventing any closure of the spark gap by spontaneous and inopportune breakdown under normal operating conditions of the spark gap, the shape and the arrangement of which portion are designed to fulfill this function. In particular, each passive portion is designed and arranged so as to reduce the intensity of the electric field between the two discharge electrodes.

The presence of the passive portion(s) according to the invention allows the shape of the active portions to be chosen and adjusted so as to increase the performance of the spark gap. In particular, it allows the shape of the active portions to be chosen and adjusted so as to reduce the risk of erosion of said portions by the arc. This shape is chosen especially so as to obtain (when an arc is struck) a high current density along said active portions, which induces a higher magnetic field, giving the arc a higher velocity of movement. This is because rapid movement of the arc reduces the risk of the active portions being eroded.

It should be noted that the terms "operating conditions of the spark gap" employed above denote the set of external operating parameters that have an influence on the proper operation of the spark gap. These operating parameters may include the voltage applied to the spark gap and the pressure of the gas (or vapor) contained in the spark gap, which gas electrically isolates the electrodes from each other in the absence of an electric arc. These conditions are called the "normal" conditions when the values taken by these parameters fall within the usual predefined ranges of use of the spark gap, for which the spark gap has been specifically designed. In particular, under normal operating conditions, the voltage applied to the spark gap must lie within a given operating range and must in particular be below a maximum operating value, which may be 1 kV to 1 MV depending on the spark gap and depending on its use. Outside these normal operating conditions, and especially if a voltage above a maximum design operating voltage is applied to the spark gap, breakdown of the spark gap is not excluded despite the presence of the passive portion(s) according to the invention. It should be noted that, if such a breakdown occurs, the electric arc formed will also appear between the active portions of the electrodes.

Under the normal operating conditions of the spark gap, the two discharge electrodes (or only one of them) possess (possesses) a passive portion.

Throughout the following, the terms "upstream" and "downstream" are used, for each of the discharge electrodes, with reference to the directrix of the active portion of the electrode and to the direction of movement of the electric arc along this active portion.

Advantageously, and according to the invention, the active and passive portions of at least one of the discharge electrodes are separate at least over a fraction of the length of the active portion downstream of the arc-triggering region. This feature makes it easier for the electrical charges to be channeled in the active portion when a current is drawn. In a first embodiment of the invention, the active and passive portions are a certain distance apart over this fraction of the length and only separated by the gas present inside the spark gap. In a second embodiment, a solid insulating element (made of a plastic for example) extends between said active and passive portions over this fraction of the length.

Advantageously and according to the invention, the spark gap includes a triggering device, such as a triggering electrode, capable of initiating the striking of an electric arc in the arc-triggering region.

As a variant, the intentional striking of an electric arc is triggered either by applying a voltage above a minimum self-triggering voltage to the spark gap, or by modifying the pressure of the gas contained in the spark gap, for the purpose of self-triggering the spark gap. In this variant, the shape and the arrangement of the active portions of the discharge electrodes are designed so that the electric arc struck by self-triggering is struck in the arc-triggering region.

Advantageously and according to the invention, the active portion of at least one of the discharge electrodes has a directrix, called the longitudinal direction, which is approximately straight, at least downstream of the arc-triggering region. As a variant or in combination, the active portion of at least one of the discharge electrodes has a curved directrix.

In a preferred embodiment of the invention, the active portions of the discharge electrodes extend substantially facing each other, at least downstream of the arc-triggering region, it being pointed out that this is understood to mean that any transverse plane (downstream of the triggering region) of the active portion of at least one of the electrodes cuts the active portion of the other electrode. The transverse direction along which the active portions are facing is called the discharge direction, taking into account the fact that the electric arc that is struck between the active portions lies substantially along this direction.

Advantageously and according to the invention, the active portions of the discharge electrodes have longitudinal connection ends placed on the same side of the spark gap, and preferably arranged substantially facing each other.

Advantageously and according to the invention, the active portions of the discharge electrodes have similar overall shapes. In particular, the active portions of the discharge electrodes both have substantially straight elongate shapes and substantially straight directrices (longitudinal directions). As a variant, they both have curved directrices with substantially the same curvature(s). In particular, the active portions may have substantially circular directrices and open ring shapes.

Whether they are straight or curved, the directrices of the active portions are preferably approximately parallel, at least downstream of the arc-triggering region. The active portions therefore face each other at least downstream of the triggering region, and the spacing between said portions is approximately constant over the entire length of the active portions. The electric arc moving along these active portions therefore also has an approximately constant length. This preferred embodiment of the invention does not exclude the possibility of providing discharge electrodes whose active portions have directrices making, between them, at one point or at any point, a nonzero angle and/or active portions whose separation is not constant. In particular, the separation of the active portions may increase toward the downstream end (in the arc movement direction).

Advantageously and according to the invention, the active portion of each discharge electrode has a shape designed so that the induced magnetic field moves the electric arc at a sufficient rate to prevent erosion of said active portions by local melting and/or vaporization (at the point of impingement of the electric arc). Such a rate avoids having to use expensive alloys (for example, copper-tungsten alloys) for producing these electrodes. Thus, advantageously and according to the invention, the active portions—and also the passive portion(s)—of the discharge electrodes are made of a basic conducting material chosen from steels, stainless steels, brasses, aluminum, copper, certain copper-based alloys, etc. (this list not being limiting).

In particular, each active portion has a surface, called the useful surface, having suitable dimensions so that the induced magnetic field moves the electric arc at a sufficient rate to prevent erosion of the active portions by local melting and/or vaporization, the useful surface of the active portion being defined (geometrically) as that surface part of the active portion which lies facing the other electrode downstream of the arc-triggering region.

This useful surface of the active portion may have, for at least one of the discharge electrodes, an approximately constant width, the term "width" denoting a dimension along a transverse direction orthogonal to the transverse discharge direction.

As a variant or in combination, the active portion of at least one discharge electrode has a useful surface of width that increases toward the downstream end (in the arc movement direction, toward the downstream end of the active portion). This feature is advantageous for the following reasons. The triggering of an electric arc draws an electric current across the spark gap, the intensity of which increases during an initial phase, before reaching a maximum value and then decreasing again toward zero (aperiodic regime) or undergoing damp oscillation (oscillating regime) until the energy initially stored in the capacitor(s) is entirely dissipated. This initial phase is critical owing to the low intensity of the current and the low kinetic energy of the electric arc. During this initial phase, the arc is moved along an upstream fraction of the active portion of the electrode, from the point where it is struck in the arc-triggering region. In order to move the arc over this upstream fraction with a high velocity, it is therefore necessary to have a strong magnetic field between the electrodes, especially one capable of compensating for the low intensity of the current in the arc. By using, for each electrode, an active portion having a useful surface of small width over such an upstream fraction, it is possible to increase the density of the current flowing in this fraction and to have a strong magnetic field facing it. However, the width of the useful surface may be greater over a downstream fraction of the active portion along which the moved electric arc possesses a high current intensity and/or a certain kinetic energy. This is because, in this downstream fraction, the induced magnetic field is sufficient to move the arc at the desired velocity without it being necessary to increase it by using a narrow active portion.

It is therefore possible to provide an active portion whose useful surface widens toward the downstream end. It should be noted that this widening may be progressive along the active portion or it may occur suddenly at one particular point (the useful surface having a constant width over fractions of the length of the active portion) . This widening makes it possible, in addition, to limit the presence of any passive portion to an upstream fraction of the active portion if, however, the useful surface of the active portion is designed so as to have, in its widened downstream fraction, a minimum radius of curvature sufficiently high for any risk of self-triggering in this region to be avoided.

As an example, in the case of a high-voltage spark gap capable of transmitting an electric current of intensity between 1 kA and 1 MA and of transferring a quantity of charge of between 0.1 and 200 C, the useful surface of the active portion of each discharge electrode has preferably a length of between 5 and 200 cm and a width of less than 50 cm over this length and less than 7 cm at least over an upstream fraction of this length. The width of the useful surface may advantageously be less than 2 cm, at least over an upstream fraction of this length if the spark gap is intended to transfer quantities of charge of less than 20 C. In all cases, the arc movement velocity obtained permits the use of electrodes made of a basic and inexpensive material, such as copper or a stainless steel.

Advantageously and according to the invention, the spark gap also has one or more of the following features:

- at least one of the discharge electrodes has an active portion having a cylindrical rod shape (such a rod has a straight directrix), at least between the arc-triggering region and its downstream end;
- at least one of the discharge electrodes has an active portion having the shape of a rod (of straight or curved directrix) of circular cross section, at least between the arc-triggering region and its downstream end. It should be noted that the width of the useful surface of such an active portion corresponds to the diameter of the rod. Said rod has a cross section of approximately constant diameter, preferably less than 2 cm if the quantities of charge to be transferred are less than 20 C. As a variant, said rod has a cross section having a diameter that increases (whether progressively or not) toward the downstream end, said diameter being less than 2 cm in the arc-triggering region if the quantities of charge to be transferred are less than 20 C; and
- the active portion of at least one discharge electrode has an electrically isolated downstream longitudinal end.

Moreover, according to the invention, at least one discharge electrode possesses a passive portion. Each passive portion preferably extends substantially facing the active portion of the electrode along the transverse discharge direction. Advantageously and according to the invention, each passive portion extends along at least one upstream fraction of the active portion of the electrode; said passive portion extends so as to project from a longitudinal edge of the active portion and so as not to pass through an intervening space lying between the active portions of the two electrodes.

The passive portion must in particular extend along at least one upstream fraction of the active portion in which the shape of said active portion (of small width and/or small radius of curvature of the active portion surface that is turned toward the other electrode . . . ) thus chosen for inducing a high magnetic field in this region also raises the electric field that can trigger the inopportune striking (self-triggering) of an electric arc under normal operating conditions of the spark gap. Depending on the shape chosen for the active portion, the passive portion may also extend over the entire length of the active portion.

Advantageously and according to the invention, each passive portion has a surface, called the useful surface, having a minimum radius of curvature that is greater than a threshold radius below which, under the normal operating conditions of the spark gap, the intensity of the electric field between the discharge electrodes is greater than a minimum self-triggering value of the spark gap (defined as being the minimum electric field intensity causing the spontaneous striking of an electric arc). The useful surface of the passive portion is defined as that surface part of the passive portion which lies facing the other electrode. It should be noted that, according to this definition, the useful surface of the passive portion may optionally extend upstream of the arc-triggering region (unlike the useful surface of the active portion as defined above).

Advantageously and according to the invention, the passive portion of at least one discharge electrode has a plane useful surface (that is to say of infinite radius of curvature).

In one embodiment of the invention, at least one of the discharge electrodes includes:

- an active portion that has, at least downstream of the arc-triggering region, the shape of a cylindrical rod of circular cross section, called an active rod; and
- a passive portion having the shape of a hollow cylindrical tube, called a passive tube, of cross section greater than that of the active rod, said tube having a longitudinal slot in front of which the active rod lies, said passive tube and said active rod both being designed so that the rod extends between the tube and the other discharge electrode. The downstream longitudinal end of the active rod is advantageously supported by a downstream longitudinal end of the tube, to which it is connected by fastening means, these means preferably being electrically insulating.

As a variant or in combination, at least one of the discharge electrodes includes, on the one hand, an active portion having, at least downstream of the arc-triggering region, the shape of a cylindrical rod, and, on the other hand, a passive portion in the form of a flat plate, said plate and said rod being a certain distance apart and arranged so that the rod extends between the plate and the other discharge electrode, parallel to said plate and in the proximity thereof.

Advantageously and according to the invention, the spark gap includes a casing inside which the discharge electrodes are placed. Said casing may have at least one conducting wall acting as a passive portion (in the form of a flat plate) of a discharge electrode.

As a variant or in combination, at least one of the discharge electrodes includes an elongate flat plate, one longitudinal connection end of which is connected to the connector. The active portion of the electrode consists of a downstream fraction of said plate and of at least one bar or rod having a length and a width that are respectively less than those of the plate, said bar or rod being fastened to an upstream fraction of said plate. The passive portion of the electrode essentially consists of the upstream fraction of the plate. Preferably, the rod lies at a certain distance from the passive portion, at least downstream of the arc-triggering region, so that, when an electric arc is triggered and an electric current is drawn, the electrical charges flowing through the electrode are channeled and concentrated in the rod—at least while the electric arc lies between the rod and the other electrode—for the purpose of inducing a high magnetic field.

Advantageously and according to the invention, the spark gap includes several pairs of discharge electrodes, said pairs being arranged in parallel. Thus, the quantity of conducted charge may be multiplied by the number of pairs of electrodes operating in parallel. In a first embodiment of the invention, at least one of the discharge electrodes of each pair is connected to a connector of the spark gap that is specific thereto. In other words, the spark gap includes, on the one hand, at least one connector per pair of discharge electrodes and, on the other hand, a single connector or one connector per pair of electrodes. In this case, electrical (inductive, resistive, temporal, etc.) decoupling means are placed between the current generator and a series of connectors (one per pair of electrodes). In a second embodiment of the invention in which the spark gap has only two connectors, it incorporates electrical (inductive, resistive, temporal, etc.) decoupling means between one of the two connectors and one of the electrodes of each pair. A third embodiment, which corresponds to a combination of the previous two and in which the spark gap incorporates internal decoupling means and is used in combination with external decoupling means, is also in accordance with the invention.

The invention also relates to a spark gap characterized in combination by any or some of the features mentioned above and below.

BRIEF DESCRIPTION OF THE SEVERAL VIEWS OF THE DRAWINGS

Other objects, features and advantages of the invention will become apparent on reading the following description, which refers to the appended figures showing preferred embodiments of the invention, given solely as non-limiting examples, in which.

DETAILED DESCRIPTION OF THE PREFERRED EMBODIMENTS

Figure 2:
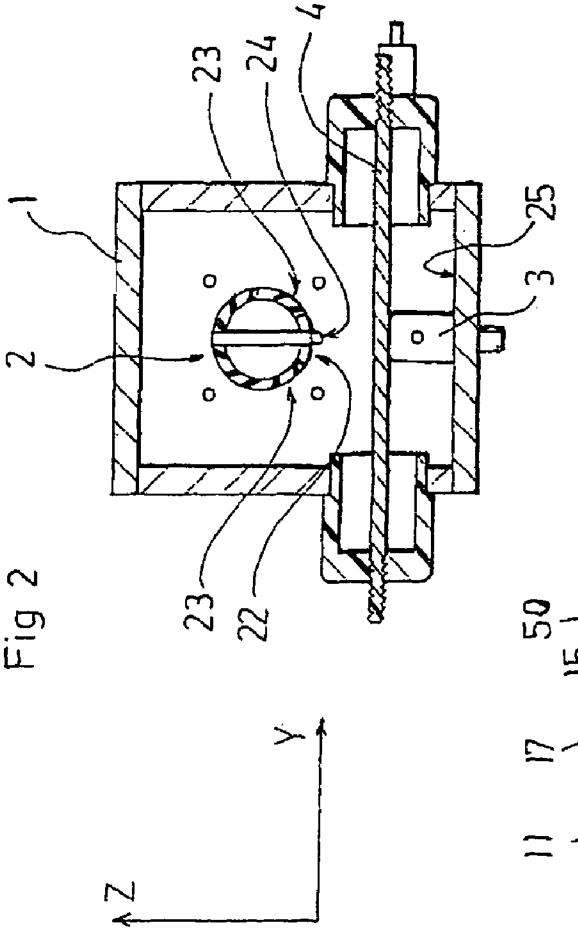
FIG. 2 is a sectional schematic view in a transverse plane of the first spark gap according to the invention.
Figure 1:
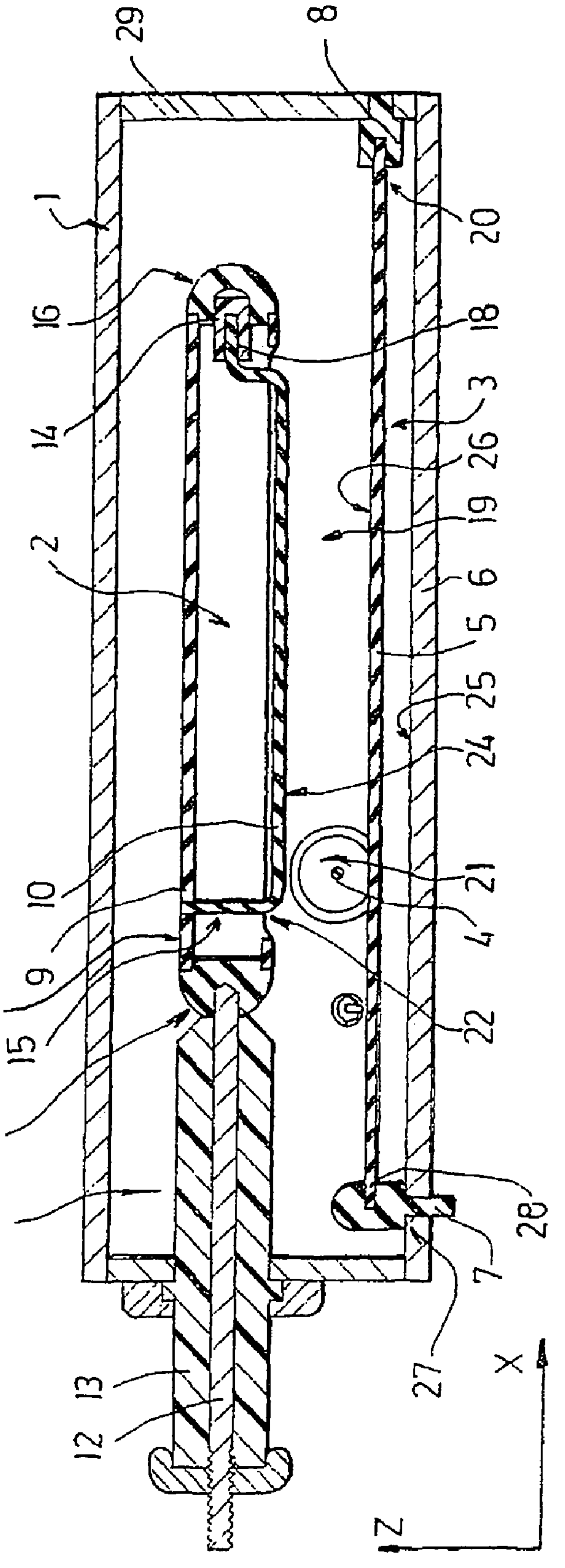
FIG. 1 is a sectional schematic view in a longitudinal plane of a first spark gap according to the invention.

The first spark gap according to the invention illustrated in FIGS. 1 and 2 comprises a conducting parallelepipedal casing 1 made of stainless steel, a first discharge electrode 2, a second discharge electrode 3 and an arc-triggering electrode 4.

Each discharge electrode 2, 3 has a straight elongate general shape, defining a longitudinal direction of the electrode. It includes a straight elongate active portion, which will be described later, the longitudinal direction (or directrix) of which coincides with that of the electrode. The electrodes lie facing each other along a transverse direction Z, called the discharge direction, so that their longitudinal directions are parallel and define a common longitudinal direction X.

The triggering electrode 4 extends between the discharge electrodes, along a transverse direction Y orthogonal to the longitudinal direction X and to the discharge direction Z. More precisely, it extends between the active portions (described below) of the discharge electrodes, near the connection ends of said active portions, and it defines an arc-triggering region 21.

The discharge electrode 2 has, on the one hand, a passive portion comprising a cylindrical hollow tube 9, called the passive tube, which has an internal radius of around 55 mm, an external radius of around 75 mm and a longitudinal slot 22 over almost its entire length. Said passive portion has a downstream longitudinal end formed by an electrically isolated endpiece 16 (isolated both from the casing 1 and from the active portion of the electrode). The passive portion is also connected to a connector 11 via an endpiece 17 and via a tube portion 50 (of short length) that extends the passive tube 9 toward the upstream end, said endpiece and said tube portion forming part of the active portion (described later) . The connector 11 passes through the casing 1 for the purpose of connecting up the electrode 2 to an electrical circuit, and especially to one or more high-voltage capacitors. The connector 11 comprises a conducting rod 12, a longitudinal end of which is soldered or welded in the endpiece 17, and a sleeve 13 made of electrically insulating material for setting the connector in the casing 1.

The passive portion of the discharge electrode 2 has a useful surface 23 directed toward the electrode 3, formed by that part of the external surface of the passive tube 9 which lies "beneath" (in FIGS. 1 and 2) a "horizontal" mid-plane, orthogonal to the discharge direction, passing through a diameter of the tube.

The discharge electrode 2 has, on the other hand, an active portion comprising a cylindrical rod 10, called the active rod, of circular cross section having an approximately constant diameter of around 10 mm and a length corresponding approximately to that of the passive tube 9. The active portion has a longitudinal connection end that extends said active rod 10 and comprises the endpiece 17, the tube portion 50 and a lug 15 for fastening the rod 10 to said tube portion 50. The active portion also has a downstream longitudinal end 18 supported by the downstream longitudinal end 16 of the passive portion to which it is connected via a peg 14 made of electrically insulating material. The active rod 10 lies so as to face, along the discharge direction Z, the slot 22 in the passive tube 9, so as to project slightly (along said discharge direction Z) from the useful surface 23 of the passive portion and so as to lie between this useful surface and the discharge electrode 3.

The active portion of the discharge electrode 2 has a useful surface 24 formed by that part of the external surface of the rod 10 which is turned toward the electrode 3 (this part is cylindrical of semicircular cross section) and which lies, along the longitudinal direction, between the triggering electrode 4 and the downstream end 18 of the rod.

The discharge electrode 3 has, on the one hand, a passive portion formed by a plate or wall 6 of the casing 1, called the passive wall. At one end 27, said wall 6 of the casing is connected to a connector 7, allowing said wall to be grounded. The connector 7 has a conducting rod passing through the wall 6 (for connection between said connector and the passive wall 6), and a mortice for housing the connection end of the active portion (described below) of the electrode 3. The discharge electrodes 2 and 3, provided with their respective connector 11, 7, are arranged so that said connectors face each other along the transverse discharge direction.

The passive portion of the discharge electrode 3 has a plane useful surface 25, formed by that part of the internal face (turned toward the electrode 2) of the wall 6 of the casing that lies, along the longitudinal direction, between the endpiece 17 and the endpiece 16 of the electrode 2.

The discharge electrode 3 has, on the other hand, a one-piece active portion consisting of a cylindrical rod 5, called the active rod, of circular cross section having an approximately constant diameter of around 10 mm. The active portion has, on the one hand, a longitudinal connection end formed by the longitudinal end 28 of the active rod, soldered or welded in the mortice of the connector 7, and, on the other hand, a downstream longitudinal end formed by the opposite longitudinal end 20 of the active rod 5, which is supported by a wall 29 of the casing 1, in which wall said end 20 is fastened by a peg 8 made of electrically insulating material. The downstream end of the active portion of the electrode 3 is thus electrically isolated. The active rod 5 of the electrode 3 lies parallel to the passive wall 6 and close to the latter. It also lies parallel to the active rod 10 of the electrode 2.

The active portion of the discharge electrode 3 has a useful surface 26 formed by that part of the external surface of the rod 5 which is turned toward the electrode 2 (this part is cylindrical of semicircular cross section) and which lies, along the longitudinal direction, between the triggering electrode 4 and the free end 16 of the electrode 2.

To fire the spark gap, the connector 11 is connected up to one or more capacitors, the connector 7 and the casing 1 being grounded. The discharge electrodes 2 and 3 are thus at different potentials, the difference between which may be up to 50 kV. The electric charges are distributed over the useful surfaces of the active and passive portions of the discharge electrodes, and an electric field appears between the two electrodes. Owing to their shape and their extent, the useful surfaces 23 and 25 of the passive portions of the electrodes act as electric field reducers, thus lowering the risk of the spark gap self-triggering under normal operating conditions thereof.

Next, an arc is struck between the active rods 10 and 5 of said electrodes, in the arc-triggering region 21, by raising the triggering electrode 4 to a given suitable potential. The presence of the triggering electrode, when it is raised to this potential, locally increases the electric field and causes a breakdown in the arc-triggering region.

A current is thus drawn between the conducting rods of the connectors 11 and 7. This current essentially flows in the active portions of the electrodes: the electric charges propagate in the endpiece 17, the tube portion 50, the fastening lug 15 and the active rod 10 of the discharge electrode 2; they are transferred to the discharge electrode 3 via the electric arc struck between the active rods 10 and 5, which arc extends substantially along the transverse discharge direction; and then they propagate in the active rod 5 of the discharge electrode 3 toward the connector 7. The current is channeled in the active rods 10 and 5.

It should be noted that the triggering electrode lies near the connection ends of the active portions of the two discharge electrodes, slightly downstream (and not opposite) said connection ends. Consequently, when a current is drawn, this flows in the active rod of each electrode over a length that corresponds, at the moment when the current is drawn, to the distance along the longitudinal direction between the connection end of the active portion and the arc-triggering region. As soon as it is drawn, the current therefore has a component along the longitudinal direction X, immediately upstream of the electric arc. In the discharge electrode 2, the current flows toward the downstream end 18 of the rod 10, whereas it flows in the opposite direction in the discharge electrode 3, toward the connection end 28 of the rod 5. The current flow in each of the active rods 10, 5 induces a magnetic field with approximately circular field lines near the rods. Between said rods, in the plane of the arc (the plane in which the two rods lie and in which the arc is struck and moved), the resultant magnetic field (the sum of the fields induced by the two electrodes) has a direction approximately orthogonal to the longitudinal and transverse discharge directions, and a "reentrant" sense in FIG. 1. The resultant induced magnetic field moves the electric arc along the longitudinal direction, toward the downstream ends 18 and 20 of the active rods 10 and 5, along said rods, which form a straight arc-movement surface. The terms "upstream" and "downstream" are defined with reference to this electric arc movement direction.

As the active rods 10 and 5 have small diameters, their useful surfaces 24 and 26 are of small width. The density of the current flowing in the active rods, along these useful surfaces 24 and 26, is therefore particularly high so that the induced magnetic field is strong and the resulting Laplace force is high. The movement velocity of the arc obtained is high enough to considerably reduce, if not prevent, any damage due to the erosion of the electrodes by the electric arc. Unlike the known spark gaps, it is therefore not necessary to use an expensive special alloy for producing the electrodes (a basic material such as a simple steel is suitable), nor is it necessary to provide a geometry for making the arc pass several times through the same point during the same firing.

Figure 3:
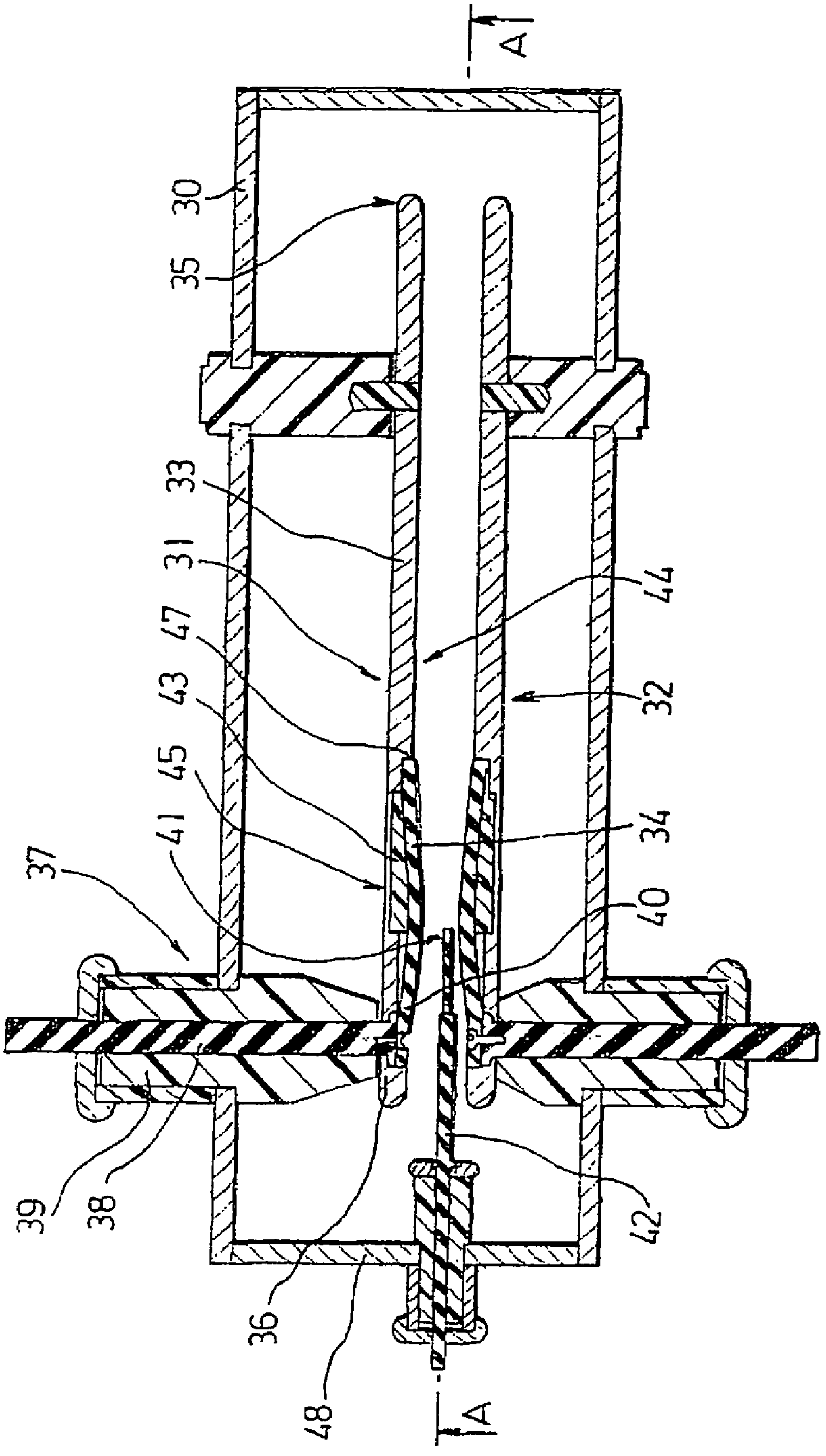
FIG. 3 is a sectional schematic view in a first longitudinal plane of a second spark gap according to the invention.
Figure 4:
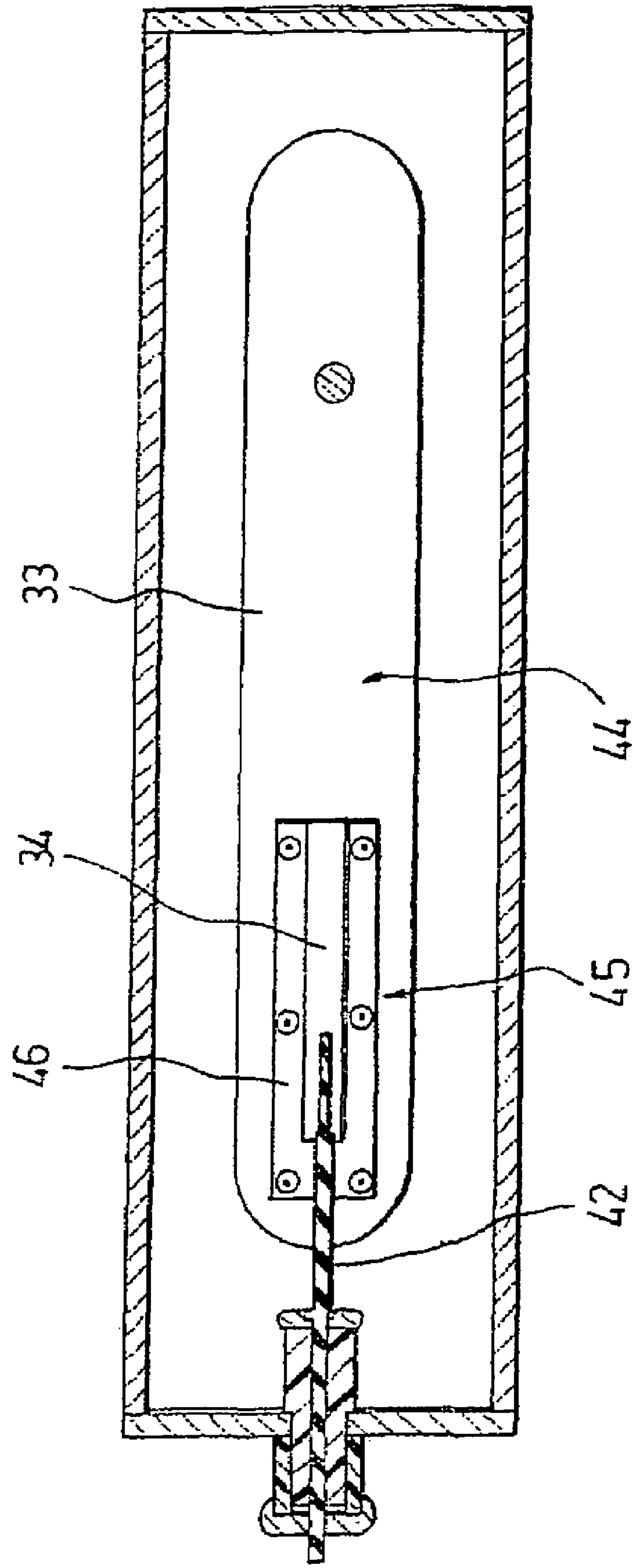
FIG. 4 is a sectional schematic view in a second longitudinal plane AA, orthogonal to the first longitudinal plane, of the second spark gap according to the invention.

The second spark gap according to the invention, illustrated in FIGS. 3 and 4, comprises: a parallelepipedal casing 30, which may or may not be conducting, produced in a steel or in any plastic; two identical discharge electrodes 31 and 32; and an arc-triggering electrode 42.

In a manner similar to the first spark gap, each discharge electrode 31, 32 has a straight elongate general shape, which defines a longitudinal direction of the electrode. Each electrode includes a straight elongate active portion, described later, the longitudinal direction (or directrix) of which coincides with that of the electrode. The electrodes are placed parallel to each other in a symmetrical manner. They lie facing each other along the transverse discharge direction Z and their parallel directrices define a common longitudinal direction X.

The triggering electrode 42 also lies along the longitudinal direction X and has, between the discharge electrodes, a free end that defines, near it, an arc-triggering region 41. The triggering electrode 42 is mounted in a wall 48 of the casing 1 by means of a sleeve made of insulating material. This sleeve makes it possible both to fasten the triggering electrode 42 to the casing 1, and to isolate the electrode from the casing and to protect that fraction of the electrode which extends to the outside of the casing 1.

Each discharge electrode 31, 32 includes an elongate flat plate 33 and a rod 34, the respective longitudinal directions of which coincide with the longitudinal direction X of the electrode. The rod 34 is fastened to the flat plate via a clamp 46 and via means consisting of screws or bolts, so as to lie facing an upstream fraction of said plate. The flat plate has a length of around 700 mm and a width (dimension along a transverse direction orthogonal to the longitudinal direction X and to the discharge direction Z) of around 100 mm. The rod 34 has a length of around 200 mm and a width of around 25 mm.

The active portion of each discharge electrode 31, 32 is formed by the rod 34 and by a downstream fraction 44 of the plate which lies in the extension of a downstream longitudinal end 47 of the rod 34 toward a free end 35 of the plate. This active portion has a longitudinal connection end formed by an upstream longitudinal end 40 of the rod 34 and a downstream end formed by the free end 35 of the plate.

It should be noted that each rod 34 is slightly curved in a plane containing the two rods (the plane in which the electric arc is struck and moved), so that the spacing between the two rods varies: it is a minimum in the arc-triggering region 41, and then increases toward the downstream end, in the direction of the ends 47 of the rods 34. When the discharge electrodes are raised to different potentials, the induced electric field between the rods 34 is therefore a maximum in the arc-triggering region. The triggering of an electric arc is thereby facilitated.

The passive portion of each electrode 31, 32 is formed by an upstream fraction 45 of the plate 33, which extends from an upstream end 36 of the plate 33 as far as the downstream end 47 of the rod 34. Said passive portion is connected via its upstream end 36 directly to a connector.

The connection ends 40 and 36 of the active and passive portions of each electrode are penetrated by the conducting rod 38 of a connector 37. The mechanical connection thus formed is electrically conducting—it allows the electrode to be connected up to an electrical circuit. In particular, one of the connectors 37 may be connected up to one or more capacitors and the other connector to a load. The conducting rod 38 of the connector is surrounded by an insulating sleeve 39, for setting it into a wall of the casing 30 and for fastening it to said wall.

In a manner similar to the first spark gap, the triggering electrode 42, when it is raised to a given potential, locally modifies the electric field in the arc-triggering region and initiates the striking of an electric arc between the rods 34. The current drawn, channeled in the rods 34, flows along the longitudinal direction X toward the downstream end—i.e. toward the free end 35—in the electrode connected to the generator, and toward the upstream end—i.e. toward the connection end 40—in the electrode connected to the load.

The current drawn induces a magnetic field between the electrodes, the direction of which in the plane of the arc is orthogonal to the longitudinal direction and to the discharge direction. The induced magnetic field moves the arc toward the free ends 35 of the active portions.

The discharge of a capacitor includes an initial period during which the current passing through the spark gap increases in intensity (from a zero initial value) . The active portion of each electrode near the arc-triggering region is advantageously formed by the rod 34, the useful surface of which has a small width so as to concentrate the electrical charges, to increase the current density, and thus to generate a high magnetic field in this region despite the low current intensity at the start of the discharge. The induced field is sufficient to move the electric arc at a velocity capable of limiting erosion. Advantageously, the rods are dimensioned in such a way that, until the intensity of the current is high enough, the moving electric arc still extends between the rods.

It should be noted that, for each discharge electrode 31, 32, an element 43 made of electrically insulating material is placed between the active rod 34 and the passive upstream fraction 45 of the plate, downstream of the arc-triggering region. This element 43 makes it possible for the drawn current to be channeled in the rod 34, at least until the moving electric arc has reached the downstream end 47 of the rod. The electrical isolation provided by the element 43 could also be obtained by leaving a space between the rod 34 and the passive upstream fraction 45, that is to say by removing the element 43, the gas contained in the casing 1 forming an insulator.

After the electric arc has reached the end 47 of the rod 34, it moves along the downstream fraction 44 of the plate. Since said plates have a greater width than the rods 34, the current density of the current flowing over the useful surface of these plates is lower than that flowing over the useful surface of the rods. The field induced between the plates 33 facing each other in this region is consequently lower, but is nevertheless sufficient for the arc to move with a high velocity, insofar as the intensity of the current in the electric arc is thereafter high (the initial phase having been completed).

The arc movement velocities obtained between the rods 34 and between the downstream fractions 44 of the plates are high enough to limit erosion of said rods and downstream fractions to the point of permitting the use of a basic material (for example any steel or copper) for manufacturing them, or of making it possible to transfer larger quantities of charge and/or higher current intensities than those usually transferred.

It goes without saying that the invention is capable of many variations with respect to the embodiments described above and shown in the figures.

In particular, and above all, a spark gap that includes a discharge electrode having no passive portion is in accordance with the invention provided that the other electrode does have one such portion.

Moreover, a spark gap comprising two identical discharge electrodes, similar either to the electrode 2 or to the electrode 3 shown in the figures, is in accordance with the invention. Likewise, a spark gap comprising one of the electrodes 2 or 3 shown, combined with an electrode such as the electrode 31, is in accordance with the invention.

Furthermore, the spark gap illustrated in FIGS. 1 and 2 could be used by connecting one of the electrodes to one or more capacitors and the other electrode to a load, modifying the electrode 3 (for example adding an insulating sleeve around the connector 7) for the purpose of isolating said electrode from the casing 1.

Moreover, the means for triggering an electric arc are not limited to the triggering electrodes shown. In particular, it is possible to use a needle-shaped electrode that passes through (along the discharge direction), but without any contact, the active portion of one of the discharge electrodes. When it is brought to a suitable given potential, such an electrode creates a plasma in its vicinity, which propagates so as to strike an electric arc. As a variant, the spark gap contains no triggering electrode. It is closed either by applying a voltage above the minimum self-triggering voltage to it, or by temporarily creating, between its discharge electrodes, an overvoltage above said self-triggering voltage. As a variant, the pressure of the gas inside the casing of the spark gap is reduced (by opening a corresponding control valve).

More generally, the shape and the structure of the electrodes are not limited to those illustrated. In particular, the active portions of the electrodes may have a curved directrix, to the point of forming, for example, a circular turn or ring which is open (or even possibly closed). The passive portions of the electrodes may have various shapes, provided that these shapes are suitable (especially through the extent and the arrangement of their useful surfaces) for preventing any inopportune self-triggering of the spark gap.

The invention claimed is:

1. A spark gap, comprising:

two rigid discharge electrodes, fixedly mounted at a certain distance from each other; and at least two connectors, each of the two discharge electrodes being connected to one of the connectors for the purpose of connecting said electrodes to an electrical circuit comprising a current generator, wherein each of the two discharge electrodes has an elongate conducting active portion having a longitudinal connection end connectable to the connector, and an opposed longitudinal downstream end, wherein the active portions of the discharge electrodes configured such that, when an electric arc is struck:

i) the electric arc is struck between the active portions of the electrodes, ii) the electric arc is struck between the active portions of the electrodes in an arc-triggering region, when the electric arc is intentionally initiated, and iii) an electric current drawn in the discharge electrodes induces, between said electrodes, a magnetic field that moves the electric arc along said active portions, and wherein at least one of the two discharge electrodes has i) at least one conducting passive portion electrically connected to the connector and/or to the active portion and with a shape configured to prevent any inopportune spontaneous striking of an electric arc under normal operating conditions of the spark gap, and ii) a useful surface having a minimum radius of curvature greater than a threshold radius below which, under the normal operating conditions of the spark gap, the intensity of the electric field between the discharge electrodes is greater than a minimum self-triggering value, said useful surface of the passive portion defined as a surface art of the passive portion facing the other of the two discharge electrodes.

2. The spark gap as claimed in claim 1, wherein each discharge electrode has a passive portion.

3. The spark gap as claimed in claim 1, wherein the active and passive portions of at least one of the discharge electrodes are separate at least over a fraction of the length of the active portion downstream of the arc-triggering region.

4. The spark gap as claimed in claim 1, wherein it includes a triggering device capable of initiating the striking of an electric arc in the arc-triggering region.

5. The spark gap as claimed in claim 1, wherein the active portions of the discharge electrodes extend substantially facing each other, at least downstream of the arc-triggering region.

6. The spark gap as claimed in claim 1, wherein the active portions of the discharge electrodes have longitudinal connection ends placed on the same side of the spark gap.

7. The spark gap as claimed in claim 1, wherein the active portions of the discharge electrodes have approximately parallel directrices.

8. The spark gap as claimed in claim 1, wherein the active portion of at least one of the discharge electrodes has a directrix, called the longitudinal direction, which is approximately straight, at least downstream of the arc-triggering region.

9. The spark gap as claimed in claim 1, wherein the active portions of the discharge electrodes have similar overall shapes.

10. The spark gap as claimed in claim 1, wherein the useful surface has dimensions such that the induced magnetic field moves the electric arc at a rate sufficient to prevent erosion of the active portions by local melting and/or vaporization, said useful surface facing the other of the two discharge electrodes downstream of the arc-triggering region.

11. The spark gap as claimed in claim 10, wherein the spark gap is configured to transmit an electric current of intensity between 1 kA and 1 MA and configured to transfer a quantity of charge of between 0.1 and 200 C, and wherein the useful surface of the active portion of each discharge electrode has a length of between 5 and 200 cm and a width of less than 50 cm over the length and less than 7 cm at least over an upstream fraction of the length.

12. The spark gap as claimed in claim 1, wherein the active portions of the discharge electrodes are made of a basic conducting material.

13. The spark gap as claimed in claim 1, wherein at least one of the discharge electrodes has an active portion having a cylindrical rod shape, at least between the arc-triggering region and the downstream end.

14. The spark gap as claimed in claim 1, wherein at least one of the discharge electrodes has an active portion having the shape of a rod of circular cross section, at least between the arc-triggering region and the downstream end.

15. The spark gap as claimed in claim 14, wherein said rod has a cross section of approximately constant diameter.

16. The spark gap as claimed in claim 14, wherein said rod has a cross section having a diameter that increases toward the downstream end.

17. The spark gap as claimed in claim 1, wherein the active portion of at least one of the discharge electrodes has an electrically isolated downstream end.

18. The spark gap as claimed in claim 1, wherein each passive portion extends along at least one upstream fraction of the active portion of the discharge electrodes projecting from a longitudinal edge of said active portion and so as not to pass through an intervening space lying between the active portions of the two electrodes.

19. The spark gap as claimed in claim 1, wherein in that the passive portion of at least one discharge electrode has a plane useful surface.

20. The spark gap as claimed in claim 1, wherein at least one of the discharge electrodes includes an active portion having, at least downstream of the arc-triggering region, the shape of a cylindrical rod of circular cross section, called an active rod, and a passive portion having the shape of a hollow cylindrical tube of cross section greater than that of the active rod, the active rod facing a longitudinal slot in said tube, the downstream longitudinal end of the active rod supported by a downstream longitudinal end of the tube.

21. The spark gap as claimed in claim 1, wherein at least one of the discharge electrodes includes an active portion having, at least downstream of the arc-triggering region, the shape of a cylindrical rod, and a passive portion in the form of a flat plate, said plate and said rod being a certain distance apart and arranged so that the rod extends between the plate and the other of the discharge electrodes, parallel to said plate and in a proximity thereof.

22. The spark gap as claimed in claim 1, further comprising:

a casing, wherein the discharge electrodes are provided inside said casing.

23. The spark gap as claimed in claim 22, wherein the casing has at least one conducting wall configured as a passive portion of a discharge electrode.

24. The spark gap as claimed in claim 1, wherein at least one of the discharge electrodes includes an elongate flat plate, and wherein the active portion of the electrode consists of a downstream fraction of said plate and of at least one rod having a length and a width that are respectively less than those of the plate, said rod being fastened to an upstream fraction of said plate, and the passive portion of the electrode consisting of the upstream fraction of the plate.

25. The spark gap as claimed in claim 1, further comprising:

at least one other two rigid discharge electrodes, each of said two rigid discharge electrodes defining a pair of discharge electrodes, all of said pairs of discharge electrodes arranged in parallel.

26. The spark gap as claimed in claim 25, wherein at least one of the discharge electrodes of each pair has a specific connector of the spark gap and the at least one of the discharge electrodes of each air is connected to the specific connector.

27. The spark gap as claimed in claim 12, wherein a basic conducting material is any of a steel, a stainless steel, a brass, an aluminum, a copper, and a copper alloy.

* * * * *